UNITED STATES PATENT OFFICE.

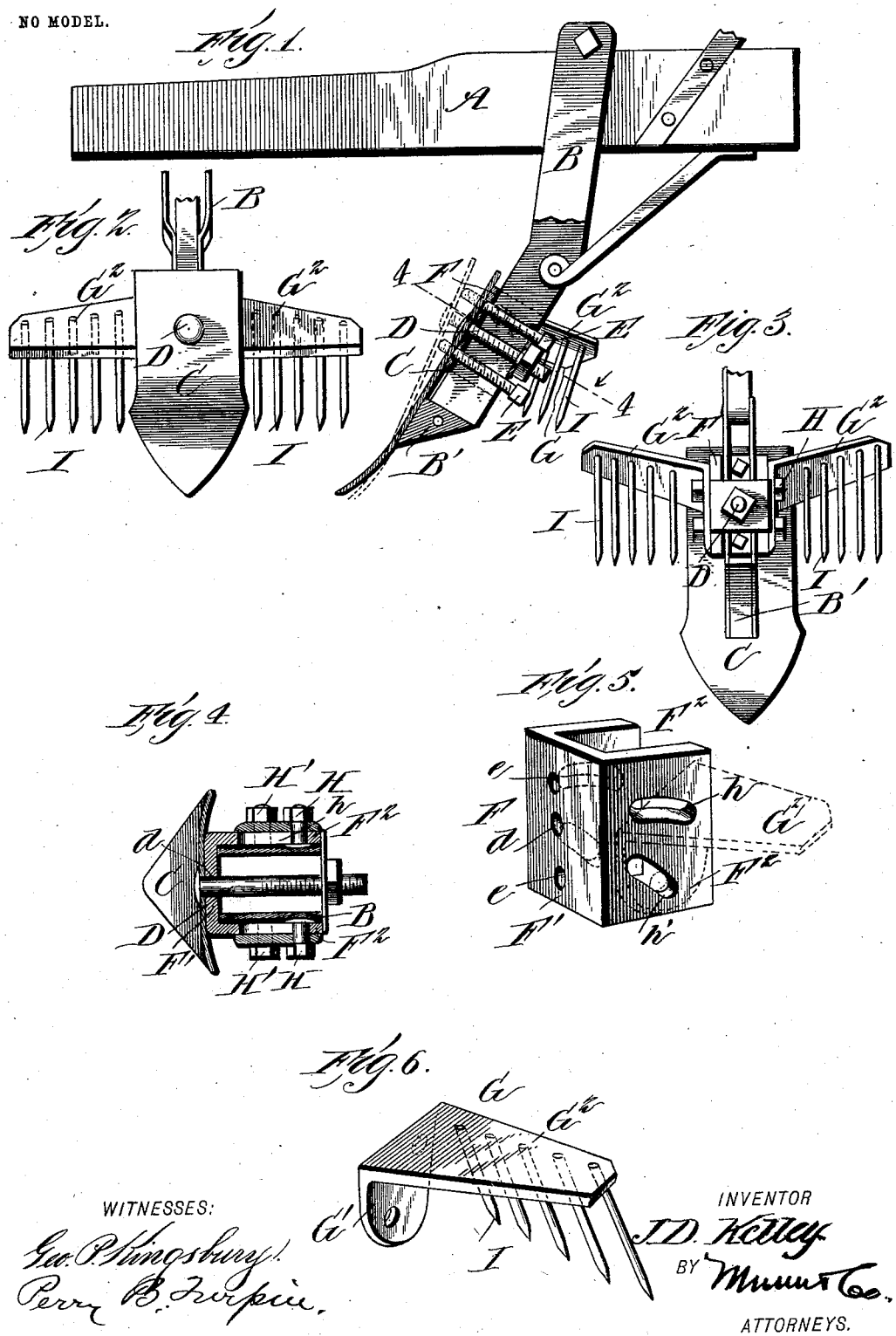

JOHN D. KELLEY, OF DOWNING, TEXAS.

PLOW AND CULTIVATOR.

SPECIFICATION forming part of Letters Patent No. 726,168, dated April 21, 1903.

Application filed December 1, 1902. Serial No. 133,317. (No model.)

*To all whom it may concern:*

Be it known that I, JOHN D. KELLEY, a citizen of the United States, and a resident of Downing, in the county of Comanche and State of Texas, have made certain new and useful Improvements in Plows and Cultivators, of which the following is a specification.

My invention is an improvement in plows and cultivators, and relates particularly to the construction of sweeps, whereby more or less soil may be applied and which may be adjusted to manipulate the soil as desired and when desired to operate as a harrow; and the invention consists in certain novel constructions and combinations of parts, as will be hereinafter described and claimed.

In the drawings, Figure 1 is a side elevation, partly in section, of a plow provided with my invention. Fig. 2 is a front elevation thereof, partly broken away. Fig. 3 is a rear elevation, partly broken away. Fig. 4 is a cross-section on about line 4 4 of Fig. 1. Fig. 5 is a detail perspective view of the cuff. Fig. 6 is a detail perspective view of one of the sweeps.

The beam A, the standard B, and the plow or cultivator shovel C may be of any suitable design, the standard being slotted longitudinally at B' for the passage of the shovel-securing bolt D and of the set-screws E, as will be understood from Figs. 1, 3, and 4.

The cuff F for supporting the sweeps G is formed with a front plate F' and side plates $F^2$, the front plate F' being perforated at $d$ for the bolt D and at $e$ for the screws E, as will be understood from Figs. 1 and 3. The side plates $F^2$ are provided with slots $h$ and $h'$, one above the other and preferably curved, as best shown in Fig. 3. These slots $h$ and $h'$ receive the bolts H and H', by which the base-plate G' of the sweep G is secured to its side plate $F^2$, as will be understood from Figs. 3, 4, and 6 of the drawings. The sweep G has the base-plate G' and the outwardly-projecting wing $G^2$, the latter being preferably sloped or inclined, as shown, so it will properly throw the dirt one way or the other, according to the adjustment of the sweep upon its supporting-cuff. To permit of adjusting the wings $G^2$ to different angles, I provide the slots, as described, and it will be understood that whenever desired the sweeps can be reversed, so that the wings $G^2$ will project from the lower edges of the base-plate G' instead of from the upper edges, as shown, and in which case the inclination of the wings $G^2$ will also be reversed. By preference I provide harrow-teeth I in connection with the wings $G^2$ and connect them adjustably with the said wings by threading them in sockets, as will be understood from Fig. 3, so the harrow-teeth can be readily removed whenever desired. These teeth will be found especially useful in light soil and will tend to break the soil up after the fashion of a harrow.

In practice the cuff F is fitted over the front side of the standard B, with its side plates $F^2$ extending along the opposite sides of the standard and the bolt D applied to the shovel and cuff to secure the parts when its nut is tightened up, as will be understood from Fig. 1. Set-screws E are arranged above and below the bolt D and are threaded through the front plate F' of the cuff F and bear against the rear faces of the shovel. By adjusting the bolt D and the set-screws E relatively the shovel can be set to different inclinations and the depth to which it will run in the ground can be regulated, as will be understood from the dotted lines in Fig. 1.

It will be understood that my invention can be readily applied to the ordinary plows and cultivators now in common use, and it may be convenient to supply cuffs F in connection with each implement, the sweeps being conveniently removable, so that the same set of sweeps can be used on the different implements.

Having thus described my invention, what I claim as new, and desire to secure by Letters Patent, is—

1. The combination with the standard and the shovel, of the cuff having a front plate and side plates, and fitting over the front side of the standard and provided in its front plate with a central bolt-hole with screw-holes above and below the same, and in its side plates with upper and lower slots, the securing-bolt passed through the bolt-hole and connected with the shovel, the set-screws threaded in the upper and lower screw-holes of the cuff-plate and bearing against the rear face of the shovel, and the sweeps having the base-plates provided with upper and lower bolt-holes, the bolts passing through said holes, and the upper and lower slots of the cuff, and securing the sweeps adjustably to the said cuff, said sweeps having the outwardly-projecting wings and the harrow-teeth in connection with said wings, substantially as set forth.

2. The combination with the standard and the shovel, of the cuff having a front plate and side plates and fitting over the front side of the standard and between the same and the shovel, devices securing the cuff in position, the sweeps secured to the side plates of the cuff and adjusting devices operating between the cuff and shovel, substantially as set forth.

3. The combination of the standard, the shovel, the cuff having the front plate and side plates and fitting over the front side of the standard between the same and the shovel, a securing-bolt for holding the shovel to the standard, said bolt passing through the cuff, and adjusting-screws threaded in the front plate of the cuff and bearing against the rear ends of the shovel above and below the securing-bolt substantially as set forth.

4. A sweep attachment comprising a cuff having a front plate provided with a central bolt-hole and upper and lower screw-bolts, and the side plates having upper and lower slots, the sweeps having base-plates provided with upper and lower bolt-holes, coinciding with the slots of the cuff, and wings projecting outwardly from said base-plates, and the bolts for securing the base-plates to the side plates of the cuff, substantially as set forth.

5. The combination with the standard and the shovel, of the cuff having a front plate fitting between the standard and shovel, and side plates lapping along the opposite sides of the shovel, the bolt connected with the shovel and passing through the front plate of the cuff and secured to the standard, the set-screws threaded in the front plate of the cuff and bearing against the rear face of the shovel and arranged above and below the connecting-bolt, and the sweeps carried by the side plates of the cuff, substantially as set forth.

6. The combination of the standard, the cuff having front and side plates and fitting over the front side of the standard, the shovel fitting against the front plate of the cuff, a securing-bolt for holding the cuff and shovel to the standard, adjusting-screws above and below said securing-bolt and bearing against the shovel, and the sweeps secured to the side plates of the cuff and projecting outwardly therefrom substantially as set forth.

JOHN D. KELLEY.

Witnesses:
GEORGE S. McDANIEL,
WILLIAM C. DAVIDSON.